US012648036B2

(12) United States Patent (10) Patent No.: US 12,648,036 B2
Han et al. (45) Date of Patent: Jun. 2, 2026

(54) METHOD AND SYSTEMS FOR MULTIPLE ACCESS POINT COORDINATION

(71) Applicants: HUAWEI TECHNOLOGIES CANADA CO., LTD., Kanata (CA); THE UNIVERSITY OF WESTERN ONTARIO, London (CA)

(72) Inventors: Wudan Han, London (CA); Xianbin Wang, London (CA); Osama Aboul-Magd, Kanata (CA); Yan Xin, Kanata (CA); Jung Hoon Suh, Kanata (CA); Kwok Shum Au, Ottawa (CA)

(73) Assignees: HUAWEI TECHNOLOGIES CANADA CO., LTD., Kanata (CA); THE UNIVERSITY OF WESTERN ONTARIO, London (CA)

( * ) Notice: Subject to any disclaimer, the term of this patent is extended or adjusted under 35 U.S.C. 154(b) by 559 days.

(21) Appl. No.: 17/877,421

(22) Filed: Jul. 29, 2022

(65) Prior Publication Data

US 2024/0040642 A1 Feb. 1, 2024

(51) Int. Cl.
H04W 76/15 (2018.01)
H04W 84/12 (2009.01)

(52) U.S. Cl.
CPC ............ H04W 76/15 (2018.02); H04W 84/12 (2013.01)

(58) Field of Classification Search
CPC .............................. H04W 76/15; H04W 84/12
See application file for complete search history.

(56) References Cited

U.S. PATENT DOCUMENTS

| | | | |
|---|---|---|---|
| 10,687,226 B2 | 6/2020 | Bahr | |
| 2013/0130681 A1* | 5/2013 | Lee ...................... | H04W 48/10 455/434 |
| 2014/0056205 A1 | 2/2014 | Aboul-Magd et al. | |

(Continued)

FOREIGN PATENT DOCUMENTS

| | | |
|---|---|---|
| WO | 2022051408 A1 | 3/2022 |
| WO | 2022132030 A1 | 6/2022 |

*Primary Examiner* — Elton Williams

(57) ABSTRACT

According to a first aspect of the disclosure, methods are discussed in which a station (STA) sends a message to an access point, for example an associated access point, about a change in multi-AP coordination parameters. A STA, which may be a mobile STA, can be in a better position than the APs themselves, for detecting changes in conditions which can affect the effectiveness, or even the desirability of the multi-AP coordination. Accordingly the STA can send a message reporting detected conditions related to multi-AP coordination. In some embodiments, such a message can request for initializing multi-AP coordination, such a message can be in response to a triggering event detected by the STA. In response to such a triggering event, the STA can analyze the STA's service needs, and send the message about a change in multi-AP coordination parameters. A second aspect of the disclosure provides an AP-to-AP negotiation process for multi-AP coordination. This can be useful either by itself or combined with the first aspect or can be used as an improvement to other multi-AP coordination methods and systems. In some embodiments, such a process includes each AP maintaining an ongoing database of adjacent APs based on prior multi-AP coordination.

18 Claims, 8 Drawing Sheets

AP3 obtains highest Coordination Score and becomes the leader AP

(56)           References Cited

U.S. PATENT DOCUMENTS

2015/0085844 A1    3/2015  Tian et al.
2021/0297897 A1*   9/2021  Cunningham  ........ H04L 1/1825
2021/0385779 A1    12/2021  Oteri et al.

* cited by examiner

AP

STA

20B

10B

30B

20A

10A

30A

10C

30C

20C

Conventional BSS-based multi-AP environment

BSS-free, user-centric, coordinated multi-AP environment detecting a triggering event by the STA served by an associated access point (AP)
100 analyzing, by the STA, the STA's service needs in response to the triggering event
130 sending, by the STA to the associated AP, a message about a change in multi-AP coordination parameters
150

METHOD AND SYSTEMS FOR MULTIPLE ACCESS POINT COORDINATION

CROSS-REFERENCE TO RELATED APPLICATIONS

This is the first application for this invention.

FIELD OF THE INVENTION

The present invention pertains to the field of communication networks, and in particular to systems and methods for communication using multiple access points (multi-AP). An aspect of the disclosure provides a method and system for WLAN multi-AP coordination.

BACKGROUND

Wireless access points (APs), for example in Wireless Local Area Networks (WLAN) according to IEEE 802.11 standards (often referred to as Wi-Fi), have traditionally operated in standalone mode. Due to more stringent end-user service requirements and increased demands of devices, and applications running on these devices, it becomes extremely challenging for APs operating in standalone mode to meet such goals. IEEE 802.11be (Wi-Fi 7) introduces the scenario of coordinated APs (multi-AP coordination), where neighboring APs can cooperate with each other for resource allocation in terms of time, frequency, power, and spatial domains.

Current proposals for multi-AP coordination rely on an AP requesting multi-AP coordination based on local conditions detected by the AP. For instance, an AP may gain channel access with a transmit opportunity (TXOP) and may initiate coordination with a second AP to allow both the APs for multi-user transmission during the TXOP.

Prior art multi-AP coordination proposals have only involved APs. However, from the service provisioning perspective, configuring the coordination among APs is challenging and sometimes even nugatory, as there is no specific expectation or requirements set for the coordination. Moreover, an AP performs necessary soundings with a group of STAs and other potential coordinating APs, which leads to low efficiency and significant overheads (i.e., round-trip of information retrieve).

Therefore, there is a need for a system and methods for multi AP coordination that obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Prior art multi-AP coordination proposals have only involved APs. This disclosure proposes station (STA) input into the coordination process.

According to a first aspect of the disclosure, methods are discussed in which a station (STA) sends a message to an access point, for example an associated access point, about a change multi-AP coordination parameters. A STA, which may be a mobile STA, can be in a better position than the APs themselves, for detecting changes in conditions which can affect the effectiveness, or even the desirability of the multi-AP coordination. Accordingly the STA can send a message reporting detected conditions related to multi-AP coordination. In some embodiments, such a message can request for initializing multi-AP coordination, or such a message can be in response by a triggering event detected by the STA. In response to such a triggering event, the STA can analyze the STA's service needs, and send the message about a change in multi-AP coordination parameters.

Accordingly, embodiments implement a user-centric multi-AP coordination scheme in which include one or both of an intelligent STA reporting mechanism and AP-to-AP negotiation process. In some embodiments, multi-AP coordination is STA-triggered and AP-initiated. In some embodiments, an intelligent STA-reporting mechanism allows the STA to explicitly express its own resource needs by identifying QoS requirements. In some embodiments an AP-to-AP negotiation process enables flexible and dynamic coordination levels by inter-AP information sharing.

In some embodiments of the first aspect, a method for multiple access point (AP) coordination is provided. Such a method includes detecting, by a station (STA), a triggering event, the STA being served by an associated access point (AP); analyzing, by the STA, the STA's service needs in response to the triggering event; and sending, by the STA to the associated AP, a message about a change in multi-AP coordination parameters.

In some embodiments, the message about a change in multi-AP coordination parameters includes a request for initializing multi-AP coordination. In some embodiments, the message includes updates to parameters for an ongoing multi-AP coordination. In some embodiments the triggering event is triggered by an internal factor related to an application running on the STA. In some embodiments, the triggering event is triggered by an external factor related to a change in quality of service conditions. In some embodiments, the request includes a report of analysed conditions. In some embodiments, the message/request is included as part of a physical layer protocol data unit (PPDU). In some embodiments the message/request is included a designated frame. In some embodiments analyzing, by the STA, the STA's service needs in response to the triggering event includes the STA measuring and analyzing QoS metrics including one or more of: i) timeliness parameters; ii) bandwidth parameters; and iii) reliability, stability, and availability, parameters. In some embodiments sending, by the STA to the associated AP, a message about a change in multi-AP coordination parameters includes: i) sending timeliness parameters: (acknowledgement) ACK delay, jitter; ii) bandwidth parameters: effective throughput, buffer size; and iii) reliability, stability, and availability parameters: SINR variation, average bit error rate and average frame loss rate.

A second aspect of the disclosure provides an AP-to-AP negotiation process for multi-AP coordination. This can be useful either by itself or combined with the first aspect or can be used as an improvement to other multi-AP coordination methods and systems. In some embodiment, such a process includes each AP maintaining an ongoing database of adjacent APs based on prior multi-AP coordination.

Accordingly in some embodiments the above described method further includes the associated AP receives the message relating to multiple AP (multi-AP) coordination from the STA; the associated AP broadcasts a message to neighboring APs listed in a table of candidate APs stored in the AP's memory; the associated AP receives replies from the neighboring APs, the replies including information relating to the STA's message; the associated AP selects an AP to act as a leader AP for the multi-AP coordination based on the information in the replies; and the associated AP participates in the multi-AP coordination according to control messages received from the leader AP.

According to the second aspect of the disclosure there is provided a method of multiple access point (AP) coordination, the method executed by an AP (associated with a station (STA)). In such a method the AP receives a message relating to multiple AP (multi-AP) coordination from the STA; the AP broadcasts a message to neighboring APs listed in a table of candidate APs stored in the AP's memory; the AP receives replies from the neighboring APs, the replies including information relating to the STA's message; the AP selects an AP to act as a leader AP for the multi-AP coordination based on the information in the replies; and the AP participates in the multi-AP coordination according to control messages received from the leader AP. In some embodiments, the AP selects a neighboring AP as the leader AP. In some embodiments, the AP updates its table of candidate APs based on the information received in the replies. In some embodiments, the information received in the replies includes a coordination score, received from each neighboring AP, according to the message relating to multiple AP (multi-AP) coordination from the STA and the method further includes the AP determining a coordination score for itself. In some embodiments, the AP selects an AP to act as a leader AP for the multi-AP coordination based on the information in the replies includes selecting the AP with the highest coordination score. In some embodiments, each AP's coordination score is computed based on resource accessibility, resource availability, and resource quality.

In some embodiments, the AP selects itself as the leader AP, and the method further includes: the leader AP determines participating APs in the multi-AP coordination; including calculating and determining a cost effective coordination scheme to satisfy the message. Such a method further includes the leader AP performing resource scheduling; and the leader AP messaging participating APs according to the scheduling for controlling the multi-AP coordination.

According to another aspect of the disclosure, apparatus is provided, where the apparatus includes modules configured to perform the methods, according to one or more aspects described herein. For example another aspect provides a station (STA) device including at least one processor; at least one wireless interface for communicating with at least one access point (AP); and machine readable memory storing machine readable instructions. The machine readable instructions, when executed by the processor configures the STA for: detecting, by a station (STA), a triggering event, the STA being served by an associated access point (AP); analyzing, by the STA, the STA's service needs in response to the triggering event; and sending, by the STA to the associated AP, a message about a change in multi-AP coordination parameters. In some embodiments, the message about a change in multi-AP coordination parameters includes a request for initializing multi-AP coordination. In some embodiments, sending, by the STA to the associated AP, a message about a change in multi-AP coordination parameters includes: i) sending timeliness parameters: (acknowledgement) ACK delay, jitter; ii) bandwidth parameters: effective throughput, buffer size; and iii) reliability, stability, and availability parameters: SINR variation, average bit error rate and average frame loss rate.

Other aspects include one or more apparatus, where the apparatus includes: a memory, configured to store a program; a processor, configured to execute the program stored in the memory, and when the program stored in the memory is executed, the processor is configured to perform methods in one or more aspects described herein.

According to another aspect, a computer readable medium is provided, where the computer readable medium stores program code executed by a device, and the program code is used to perform the methods in one or more aspects described herein.

According to another aspect, a chip is provided, where the chip includes a processor and a data interface, and the processor reads, by using the data interface, an instruction stored in a memory, to perform the methods in one or more aspect described herein.

Other aspects of the disclosure provide for apparatus, and systems configured to implement the methods according to the methods disclosed herein. For example, wireless stations and access points can be configured with machine readable memory containing instructions, which when executed by the processors of these devices, configures the devices to perform the methods in one or more aspects disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
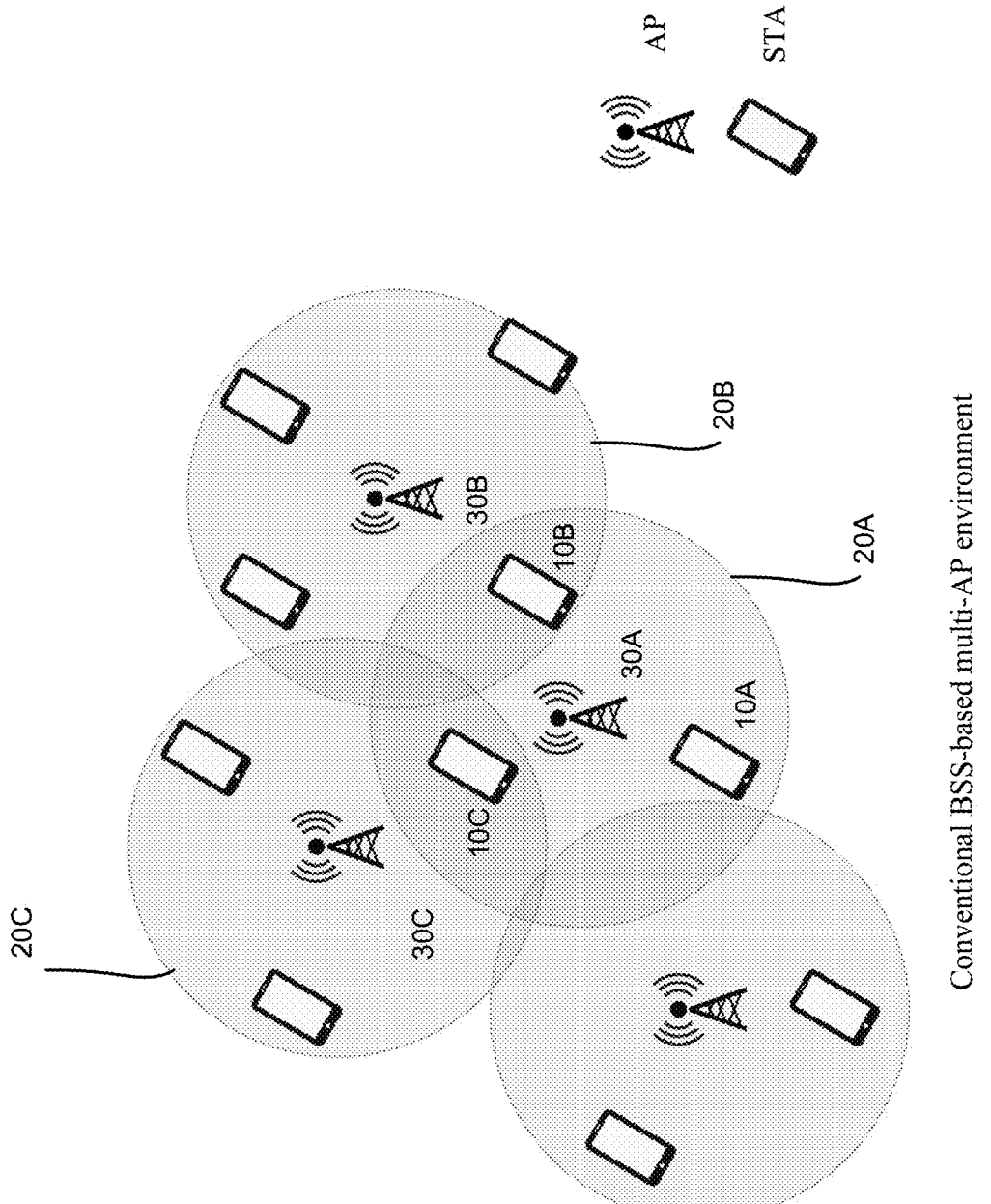
FIG. 1 schematically illustrates a Basic Service Set (BSS) based environment.

A wireless communications system to which embodiments of the present disclosure are applicable may be a wireless local area network (Wireless local area network, WLAN) device, referred to as a station (STA). Such a STA may be a mobile STA, but that is not a requirement. For example, as will be apparent, embodiments of the disclosure are applicable for fixed STAs or APs. The communications device may be a wireless communications device that supports other wireless protocols.

Multi-AP coordination schemes have been discussed as main candidate features for adoption in Wireless LAN (WLAN) 802.11 standards. Enabling some degree of coordination among neighboring APs permits more efficient utilization of limited wireless resources, such as time, frequency, and spatial resources. Additionally, enabling information sharing among coordinated APs (i.e., user scheduling and channel quality information) can ameliorate co-channel interference which becomes unbearable in increasingly densified wireless networks. Therefore, embodiments allow for multi-AP coordination which can turn the interfering APs into servers in the case of STAs located at overlapped basic service sets (BSS).

Further, as devices become more powerful and allow for execution for increasingly complex applications, it is expected that there will be increasingly diversified and multi-dimensional QoS requirements from the rich application domains (e.g., multi-party cloud gaming and Extended Reality). Accordingly, there is a need for more efficient and intelligent resource allocation strategies to meet user demands.

Accordingly, embodiments provide for a user-centric approach, which allows multi-AP collaboration to allow for increased performance gains from potential service providers. It is noted that the term "user-centric" is used, as many STAs are user devices, and the application running on the STA are often user applications. However the term STA-centric approach could also be used.

In particular, such user-centric design is empowered by flexibly adjusting the scope of multi-AP coordination with situation awareness. Different combinations of the coordinated resource domains lead to different schemes with different levels of implementation trade-offs, as shown in Table I (which is summarized from C. Deng et al., "IEEE 802.11be Wi-Fi 7: New Challenges and Opportunities," in IEEE Communications Surveys & Tutorials, vol. 22, no. 4, pp. 2136-2166, Fourth quarter 2020).

Different embodiments can provide for a STA-tailored QoS enhancement, which can depend on specific user (application) needs and STA measurable conditions. For example, a STA can provide data relevant to making decisions relating to interference mitigation; the facilitation of AP handover and load balancing; and the efficient multi-dimensional resource scheduling and orchestration. Examples of each of these are now given:

One advantage of multi-AP coordination is interference mitigation. For example, the edge users at overlapping basic service set (OBSS) may suffer from co-channel interference. Co-channel interference can be worse in some locations, which can particularly problematic for some STAs which are (semi-) static in terms of their geographical location. Enabling multi-AP coordinated transmission can counteract such negative effect. However, the STAs are better positioned to measure co-channel interference than the AP's.

Another advantage is multi-AP coordination can facilitate AP handover and load balancing. When STAs roam across multiple BSS, their service requests can be leveraged to trigger multi-AP coordination. Such coordinated resource provisioning by multiple APs may facilitate fast association and handovers, reducing interruption of services due to improved re-connection speed.

Another advantage is multi-AP coordination enables efficient multi-dimensional resource scheduling and orchestration. Referring to coordinated-OFDMA as example, APs can synchronize their data transmissions and allocate orthogonal time/frequency resources for multiple STAs. In this way, the collision probability is greatly diminished comparing with the case when APs independently conduct contention-based channel access procedure. Moreover, coordinated OFDMA can facilitate the latency reduction of short packet data transmissions given that it allows efficient sharing and full occupation of the operating band, which otherwise would not utilize the available resources to their full potential.

While the above advantages apply to multi-AP coordination in general, this disclosure provides additional benefits by providing methods and systems to intelligently serve STAs with multi-dimensional resources in a user-centric way. Accordingly embodiments extend the resource utiliza-

TABLE I

| | Coordinated OFDMA | Coordinated Spatial Reuse | Coordinated Beamforming | Joint Transmission |
|---|---|---|---|---|
| Coordinated resource domain | Time, frequency | Power, spatial | Spatial | Spatial, time, frequency |
| Number of serving-AP per STA | Single AP | Single AP | Single AP | Multiple APs |
| Synchronization requirement | Symbol level | PPDU level | Symbol level | Tight time/frequency/phase synchronization, may require the backhaul connection between APs |
| Complexity | Low, medium | Low | Medium | Very high |

Overview and comparison of 4 multi-AP coordination schemes

One advantage of the methods and systems disclosed herein arises from the realization that STA can be in a better position to evaluate at least some of these criteria, than an AP. This can depend on internal factors of the STA (e.g., the requirements of the application running on the STA), as well as external factors (conditions of the local STA which can be monitored and analyzed by the STA).

tion scope from single-AP standalone operation to multi-AP resource orchestration based on input provided by the STAs.

FIG. 1 schematically illustrates a Basic Service Set (BSS) based environment. Each BSS 20 is served by an AP 30. Accordingly BSS 20A is served by AP 30A, BSS 20B is served by AP 30B, and BSS 20C is served by AP 30C. As can be seen STA 10A is within BSS 20A, whereas STA 10B is within both BSS 20A and BSS 20B, and STA 10C is within both BSS 20C and BSS 20A. STA 10A, being within BSS 20A, would be served by (or associated with) AP 30A.

STA 10B being within both BSS 20A and BSS 20B, could be served by AP 30A or 30B. However, if STA 10B is served by AP 30A, it may receive co-channel interference from AP 30B.

Figure 2:
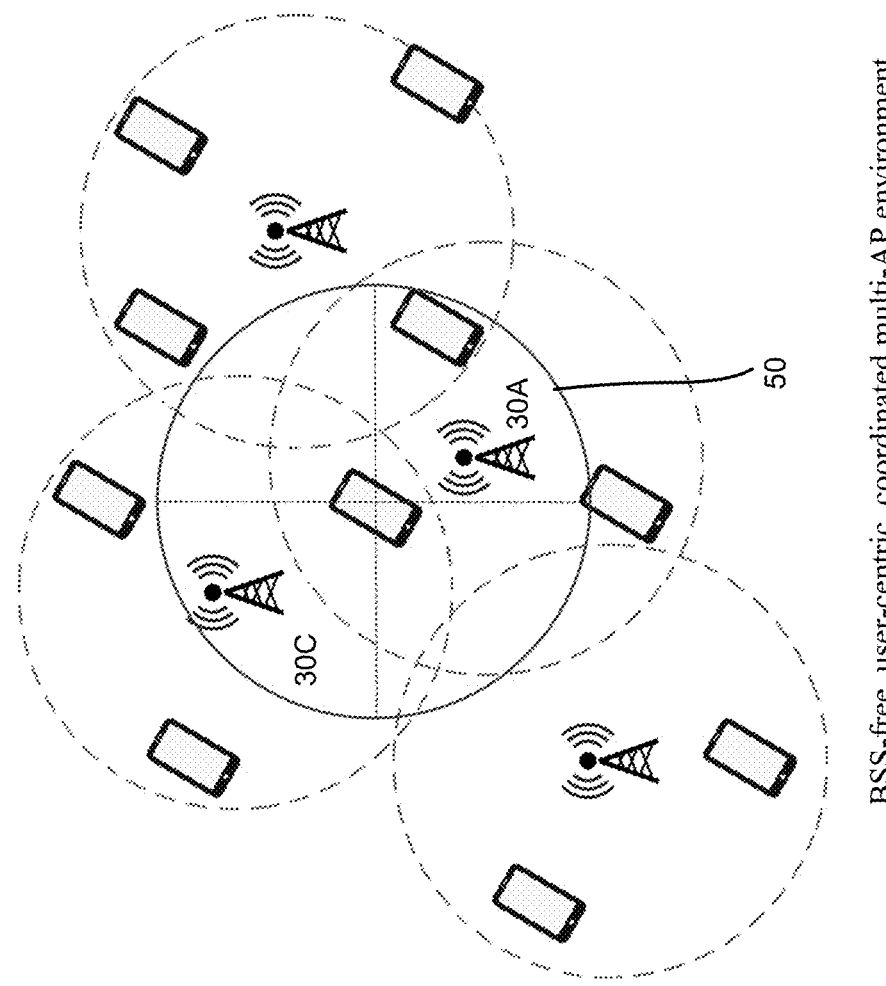
FIG. 2 illustrates a user-centric approach, according to an embodiment.

FIG. 2 illustrates a user-centric approach, according to an embodiment, which in turn, eliminates conventional disadvantaged BSS-edge STAs. Instead of evaluating the performance by individual BSS, such an embodiment utilizes a cooperative resource-serving cluster of spatially distributed adjacent APs specifically for each STA. In order to avoid cluttering the figure, FIG. 2 illustrates a single cluster 50, centered on STA 10C, which contains AP 30A and 30C. However, it should be appreciated that each STA would have its own user-centric cluster.

Figure 3:
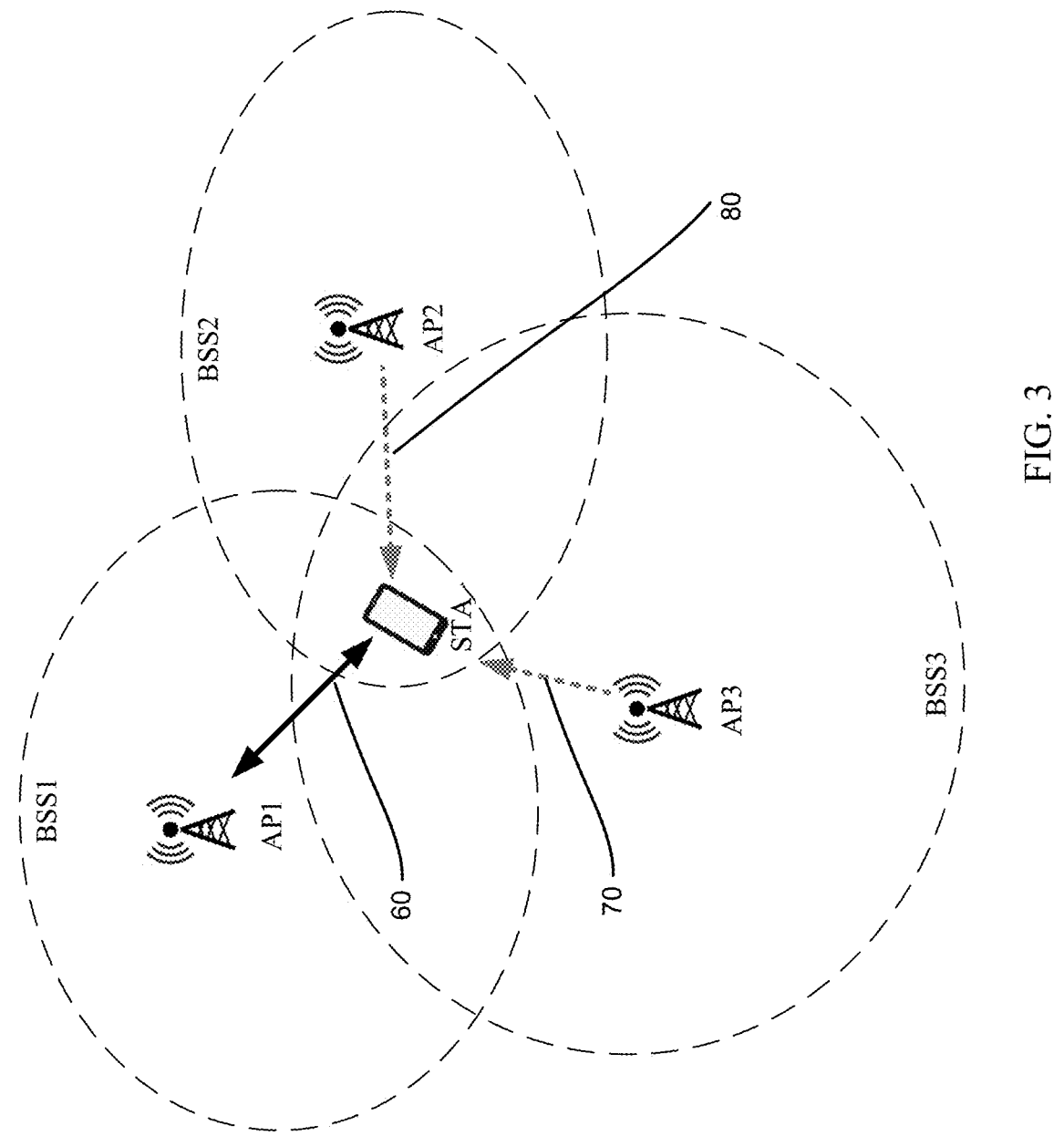
FIG. 3 is a system model illustrating an example of co-channel interference from Overlapping Basic Service Sets (OBSS).

FIG. 3 is a system model illustrating an example of co-channel interference from overlapping Basic service sets (OBSS). The STA is currently associated with AP1, as illustrated by solid line 60. However, the STA experiences co-channel interference by neighboring APs (i.e., AP2 and AP3), as illustrated by dashed lines 80 and 70 respectively.

Figure 4:
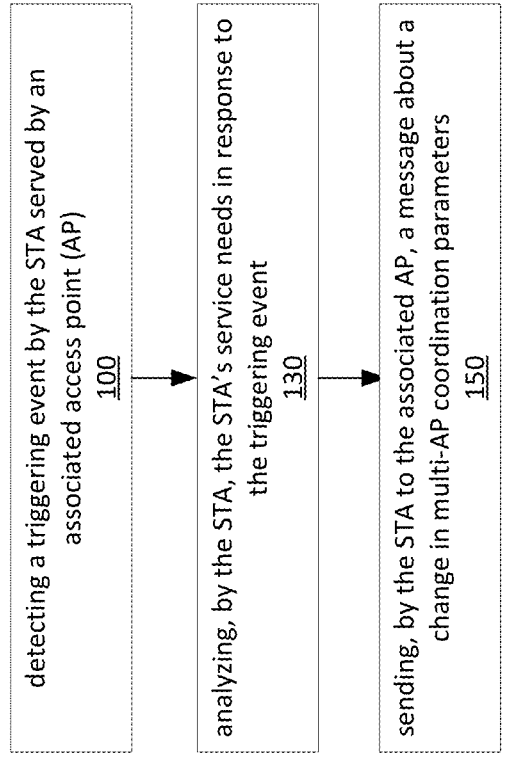
FIG. 4. illustrates a method implemented by a STA, according to an embodiment.

FIG. 4. illustrates a method implemented by a STA, according to an embodiment. Such a method includes detecting a triggering event 100 by the STA, the STA being associated with an access point (AP). Examples of such a triggering event will be discussed below. Such a method further includes analyzing 130, by the STA, the STA's service needs in response to the triggering event. Examples of such an analysis will be discussed below. The method further includes sending 150, by the STA to the associated AP, a message about a change in multi-AP coordination parameters. Such a message can include a request for initializing multi-AP coordination, or it can provide an update to the parameters for an ongoing multi-AP coordination.

Triggering event 100 can depend on internal factors (factors internal to the STA) or external factors (factors external to the STA). In some embodiments, the triggering event 100 is triggered by an internal factor related to an application running on the STA. Examples of internal factors can be the launch of (or a request by) a bandwidth-hungry or delay-sensitive applications executing on the STA device. In some embodiments, the triggering event 100 is triggered by an external factor related to a change in quality of service conditions. For example, a sudden deterioration of channel quality or OBSS interferences are examples of external factors.

TABLE II

| STA-specified predictive QoS information reporting | | |
|---|---|---|
| Example of external factors | Consequences of external factors that can be detected/analyzed by STA | How will it affect multi-AP coordination |
| Co-channel interference | STA may detect arbitrary high RSSI (received signal strength indicator) because it includes energy from both the interference and desired signal<br>STA detect low SINR | APs may simply coordinate in power domain-serving-AP increases whereas interfering-AP reduces their transmit power level in order to lower the interference imposed on STA |
| Mobility | Doppler frequency shift can be detected by STA<br>Increased BER (bit error rate)<br>Increased variation of RTT (round trip time)<br>Increased variation of RSSI etc. | APs may coordinate in joint frequency, power and spatial domains for time being in order to meet STA's request. |

As indicated, mobility of the STA can be relevant for multi-AP coordination, as mobility of the STA can change the QoS parameters. Accordingly the mobility of the STA can be monitored and analyzed by the STA, based on external factors, such as the conditions outlined in Table II. In some embodiments, the mobility of the STA can be detected as an internal factor (detected by an accelerometer or GPS application running on the STA). It should be appreciated that this determining whether a triggering event 100 is based on an internal or external factor is not crucial. For example mobility can be detected, reported and can be used to influence the request by the STA, regardless of whether it is detected by an internal or external factor.

Analyzing 130, by the STA, the STA's service needs in response to the triggering event, according to embodiments will now be discussed. The STA monitors and analyzes the conditions of the air interface and link measurements. Then, STA analyzes own service needs resulting from the triggering event 100 and makes decision whether or not to report (sending message 150) to the associated AP.

Accordingly embodiments involve a QoS-related information reporting mechanism by the STA to evaluate and identify STA resource needs. In some embodiments, this includes configuring the STA to locally perform information processing and analysis in advance in order to (1) eliminate unnecessary and cumbersome reporting to AP; and (2) avoid false alarms. Such QoS-related reporting can facilitate the AP(s) to decision regarding resource allocation parameters, such as transmit power, bandwidth (RUs), acceptable delay, queueing, and spatial beamforming designs. Furthermore, in some embodiments, the STA's analysis can trigger a minimum requirement for multi-AP coordination.

In order to report with high efficiency, in some embodiments, QoS metrics are measured and parameterized by: i) timeliness, ii) bandwidth iii) reliability, stability, and availability, all of which are calculated by each individual STA to reflect their own specific situations. In some embodiments the STA measures and analyzed the PHY and MAC layer metrics to identify and express STA's resource needs, also in order to support the differentiation of services with diverse requirements. As stated, sending 150, by the STA to the associated AP, a message about a change in multi-AP coordination parameters can include one or more of a request for initialization of multi-AP coordination; and reporting on parameters relevant for controlling and updating multi-AP coordination. Accordingly, in some embodiments, the STA sends to the associated AP, a message about a change in multi-AP coordination parameters which can include one or more of:

i) timeliness parameters: (acknowledgement) ACK delay, jitter (delay variation));

ii) bandwidth parameters: effective throughput, buffer size); and iii) reliability, stability, and availability parameters: SINR variation, average bit error rate and average frame loss rate parameters.

The reporting includes but not limited to the listed QoS information shown in the Tables-III and IV below.

TABLE-III

| STA-QoS metrics and parameters: | | |
|---|---|---|
| (1) Timeliness | MAC Delay | MAC delay is measured by the time taken to transmit a frame from source to destination (i.e., STA to AP) in a contention-based MAC, including the total time deferred and the time to acknowledge the data. |
| | Jitter | Jitter is measured by the variation in the frame arrival time within a stream of transmissions. High value of jitter is a sign of congestion. |
| (2) bandwidth | Effective throughput | Effective throughput is calculated by the fraction of the total number of successfully transmitted packets to the total MAC service time of packets arrivals in an interval, i.e., $$\text{effective throughput} = \frac{\sum_{N_{succ}} S}{\sum T_{srv}}$$ where S is the averaged packet size, $N_{succ}$ is the total number of successfully transmitted packets, and $T_{srv}$ refers to the interval from the time that a frame starts to contend for transmission, to the time that STA correctly receives ACK response or drop it after several failed retransmission tries. |
| | Available bandwidth | $$\text{available bandwidth} \approx \left(1 - \frac{T_{busy}}{T_{total}}\right) \times B$$ where B is the raw available bandwidth in the network $T_{busy}$ is defined as the total time that STA is sending/receiving packets or sensing packet transmissions within an interval of $T_{total}$. |
| reliability, stability, and availability | Frame loss ratio | It is defined as the percentage of total amount of frames that are lost at the MAC layer due to collisions or MAC queue overflow or frame reaches their timeout values. |
| | RSSI | RSSI measures the relative quality of a received signal to a STA, which can be used to facilitate localization process. |
| | MCS index | MCS index describes the modulation type and coding rate used across a set of channel width, guard intervals, and spatial streams. A low MCS index indicates STA is facing significant challenges with its RF environment. |

TABLE IV

| STA-specified predictive QoS information reporting | | | |
|---|---|---|---|
| | | Category | |
| Layers | 1. Timeliness: | 2. Bandwidth: | 3. Reliability, stability, and availability: |
| MAC layer | MAC Delay Jitter | Effective throughput Available bandwidth Buffer size | Frame loss ratio |

TABLE IV-continued

| STA-specified predictive QoS information reporting | | | |
|---|---|---|---|
| | | Category | |
| Layers | 1. Timeliness: | 2. Bandwidth: | 3. Reliability, stability, and availability: |
| PHY layer | — | — | SINR and SNR Received signal strength indicator (RSSI) Bit error rate (BER) Modulation and Coding Scheme (MCS) index Reference Signal receive power (RSRP) |

In some embodiments, the STAs can make use of learning-based methods to locally analyze historical data and achieve situation-awareness by prediction. More specifically in some embodiments, the STA performs analysis (e.g., derive the probability distribution of service inter-arrival time) by learning-based methods (i.e., machine learning and deep reinforcement learning) on the QoS information to make the reporting more accurate and efficient. Accordingly, in some embodiments, the STA can proactively generate report of analyzed conditions. That is to say, STA is able to proactively send request to AP. Since setting up multi-AP coordination also takes time, STA's proactive/predictive request can help reduce latency in waiting. For example, if a STA detects (predicts) urgent servicing needs to arise, in some embodiments, the STA can then use a designated frame to report instead of physical layer protocol data unit (PPDU) to report, rather than waiting for the AP to trigger the sending of the PPDU.

TABLE IV

| Reporting methods | | |
| --- | --- |
| Details | When to use |
| I Use a designated frame to achieve real-time reporting [Instantaneous reporting] | Real-time reporting can be particularly helpful for delay-sensitive, high-priority and high-urgency applications running at the STA |
| 11 Report the QoS-related info by piggybacking the PPDU frame to the AP [Triggered-based reporting] | the QoS parameters will be measured over time by the STA, but reported as needed when the AP requests a PPDU frame |

Above embodiments have discussed methods executed by a STA in requesting multi-AP coordination and reporting on multi-AP coordination parameters.

Methods executed by the APs will now be discussed, according to embodiments.

Figure 5:
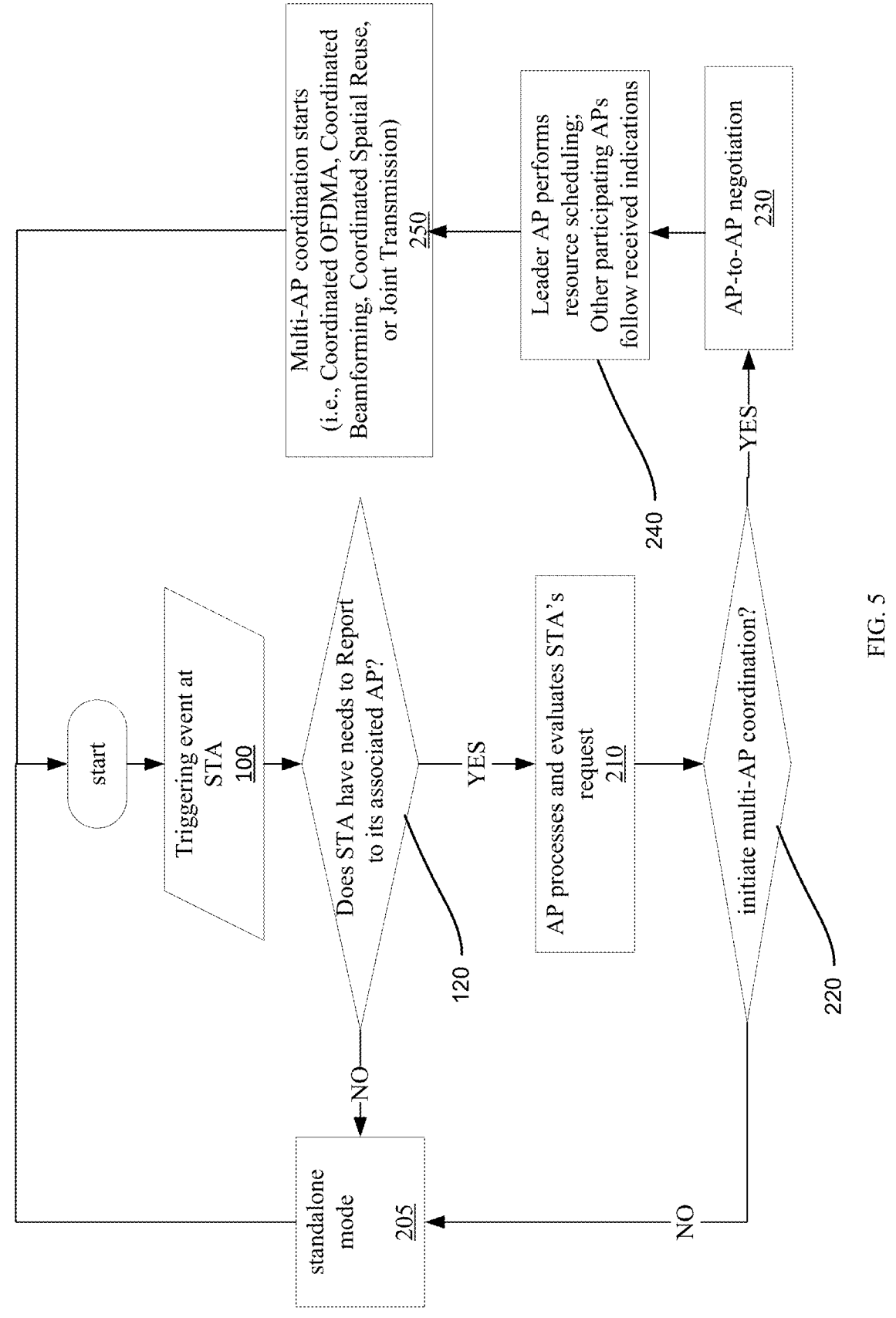
FIG. 5 illustrates a method for initiating multi-AP coordination, according to a system including an STA and the APs, according to an embodiment.

FIG. 5 illustrates such a method, for initiating Multi-AP co-ordination, according to a system including the STA and the APs, according to an embodiment. In FIG. 5. The STA responds to a triggering event 100 by evaluating the STA's service needs with respect to possible multi-AP coordination 120. If multi-AP coordination is not requested, the APs and the STA remain in conventional standalone mode (the STA is served by a single AP) 205.

After the AP receives and evaluates the request from STA 210, the AP will further decide whether to initiate multi-AP coordination 220, or simply follow the routine of standalone transmission 205. If the multi-AP coordination is selected, the first step is to perform AP-to-AP negotiation 230, which is executed to determine the coordination scope of participating APs.

During the negotiation 230, a leader AP will be elected in order to take the role of resource scheduler and coordinator. More details of this negotiation 230 are discussed below with reference to FIGS. 6 and 7. Next, upon the completion of AP-to-AP negotiation 230, the elected leader AP will perform 240 multi-dimensional resource scheduling and inform all participating APs for their respective duties. More specifically, multi-dimensional resource scheduling can include one or more of the TXOP in time domain (e.g., via enhanced distributed channel access (EDCA)), the spatial streams in space domain (e.g., adjusted by multiple-input multiple-output (MIMO) techniques), the resource unit assignments in frequency domain via orthogonal frequency division multiple access (OFDMA), and the transmit power allocation in power domain. The participating APs follow received indication and perform the coordinated transmission 250.

Depending on the "specific situations", the final result of multi-AP coordination can be categorized as either Coordinated-OFDMA (Co-OFDMA), Coordinated Beamforming (Co-BF), Coordinated Spatial Reuse (Co-SR), or Joint transmission (JTX). Here, specific situations rely on two factors: i) details from the STA's request, and ii) results from the AP-to-AP negotiation. In other words, from the resource utilization perspective, it is the STA's request and the AP-to-AP negotiation that jointly determines which resource domains should be coordinated.

In some embodiments, for instance, when a TXOP-owner AP shares its TXOP with its neighboring APs, it may also coordinate the available frequency, spatial, and (or) power domain resources with these APs, which lead to four different situations:

In some embodiments, temporal and frequency domain resources are coordinated among the participating APs, and the multi-AP coordination can be classified as Co-OFDMA. For example, in the situation of latency reduction for short packet data transmissions, Co-OFDMA with synchronized TXOP and full occupation of the band will diminish collision probability during the contention-based channel access procedures.

In some embodiments, spatial and power domains are coordinated among APs, and the multi-AP coordination can be classified as Co-SR. When OBSS signals are detected, APs can coordinate with each other in a TXOP to dynamically increase or reduce the transmit power levels, in order to mitigate the interference and improve the throughput. The BSS size is flexibly modified during the coordination (hence to perform spatial reuse among coordinated APs.

In some embodiments, only spatial domain resources are coordinated, and the multi-AP coordination can be classified as the Co-BF. Multi-antenna APs can use null steering and beamforming techniques to further enhance spatial multiplexing capability. Compared to Co-OFDMA, Co-BF requires the overlapping APs to organize their scheduling decisions and acquire accurate CSI from non-associated STAs for effective placement of radiation nulls.

In some embodiments, spatial, temporal and frequency domain resources are all coordinated, and the multi-AP coordination can be referred to as the most intricate case JTX. Non-co-located APs perform joint transmission and (or) reception from (to) multiple STAs reusing same time/frequency resources. JTX is more likely to achieve the full potential to harvest all performance gains. However, the implementation complexity and high-speed backhaul connection is a tradeoff to be considered when choosing JTX.

Therefore, coordination in different resource domains will lead to different multi-AP coordination use cases (refer to 4 categories listed above as well as in Table-I). Some embodiments can utilizes a unified procedure design that covers above described scenarios.

Figure 6:
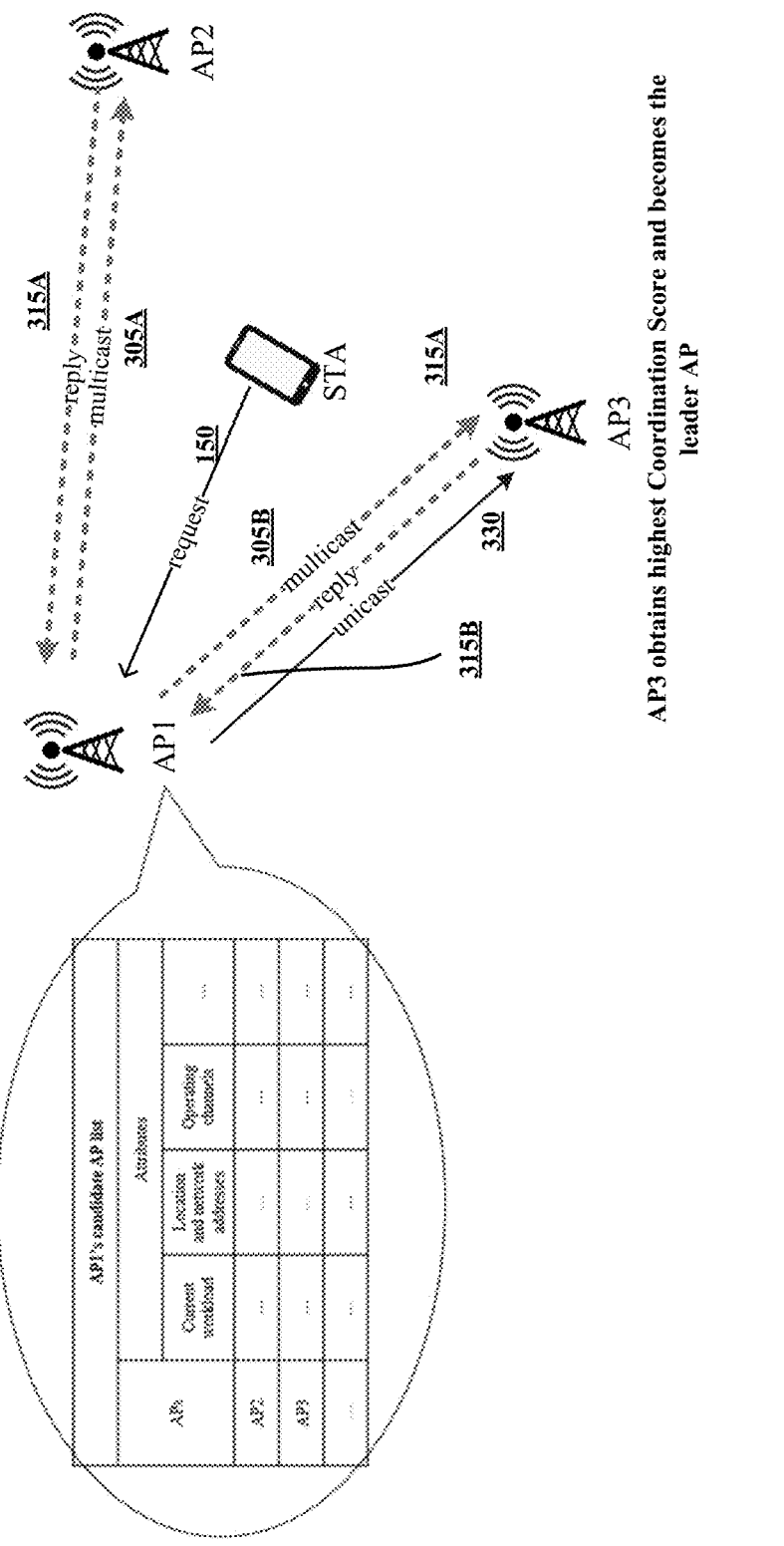
FIG. 6, illustrates a multi-AP coordination session by an AP maintaining a candidate AP list according to an embodiment.

Methods implemented by the APs will now be discussed according to embodiments. In some embodiments, the AP-to-AP negotiation process, has an objective to maximize the resource utilization while minimizing the communication overheads among APs. In some embodiments, each AP maintains a candidate AP list which contains the latest information and attributes of their neighboring APs. FIG. 6. Illustrates an example of embodiment for which three APs (AP1, AP2 and AP3) are involved in an AP negotiation. Accordingly FIG. 6. illustrates an AP candidate list for AP1 (which includes neighboring APs AP2 and AP3)

In some embodiments each AP maintains a candidate AP list, which is built and updated by information-exchanges and past coordination experiences among the APs. Table-V shows an example of information used for establishing a candidate AP list, which includes available resources, current workload, and their operating details.

TABLE V

| Information and parameters used in AP-to-AP negotiation process |
| --- |
| Number of current associated STAs and their identifiers |
| Number of STAs who are using delay-sensitive applications |
| Aggregated DL and UL throughout |
| Geolocation and SINR of STAs |

TABLE V-continued

Information and parameters used in AP-to-AP negotiation process

AP hardware and software loading indicator
AP RU load indicator
Available channels (RUs)
Maximum transmit power After the original AP that is associated with the STA receives STA's request, it broadcasts STA's resource demands to all APs in its candidate AP list. Therefore, all the APs can calculate the coordination score with respect to STA's request.

The coordination score can be measured by three metrics: resource accessibility, resource availability, and resource quality.

Coordination Score of an AP for STA's request =

$$w_1 \cdot \{resource\ accessbility\} +$$

$$w_2 \cdot \{resource\ availability\} + w_3 \cdot \{resource\ quality\}$$

where w is the weighting factor in this example model. More specifically, these three metrics can be flexibly defined and adjusted in practice. Each AP evaluates own resource provisioning capability for the STA's request by performing necessary soundings (e.g., by measuring CSI to the STA). Here we define:

Resource availability: to evaluate the availability of bandwidth (or RUs), TXOPs, transmit power budget and spatial streams at different AP side.

Resource accessibility: to evaluate i) the distance between the requesting STA and different APs ii) the admission probability of STA's request served by different APs.

Resource quality: to evaluate the link quality between the requesting STA and different APs, which can be judged by the SINR, RSRP, and RSSI.

For instance, in Coordinated OFDMA, the AP that is a TXOP owner gets higher score in the "resource availability" part and the AP that has the shorter geographical distance to the requesting STA has the potential of getting higher score in the "resource accessibility" part.

Noted that during one multi-AP coordination session, the APs share the same methodology (or metrics) for computing the Coordination Score to avoid confusion in the process for the election of a leader AP.

The coordination score is used to evaluate/verify each AP's eligibility, suitability, and implementation complexity of participating in multi-AP coordination. In some embodiments, the original collects and compares all the scores. The AP with the highest score will be elected as the leader AP.

Figure 7:
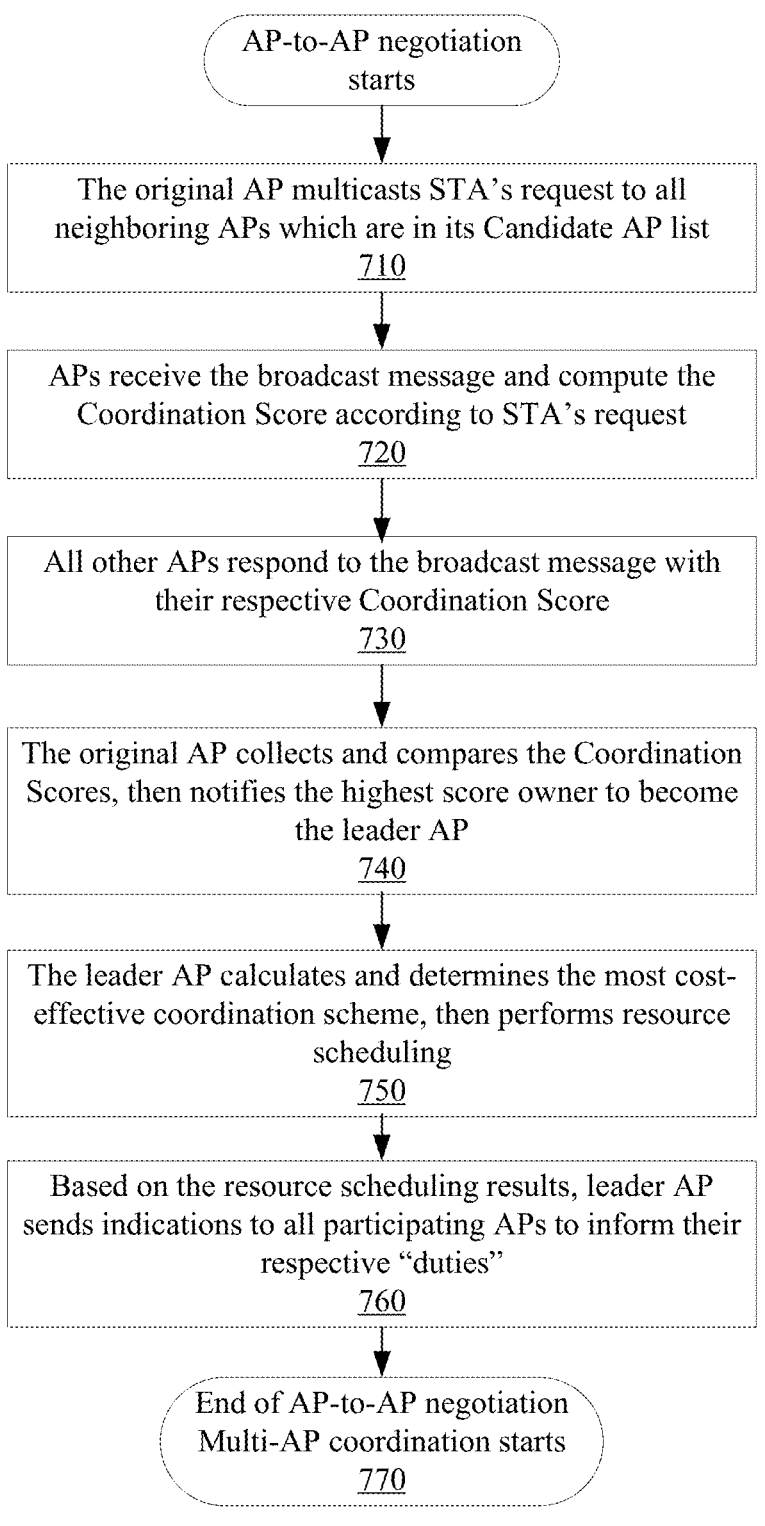
FIG. 7 illustrates an AP-to-AP negotiation method, according to an embodiment.

FIG. 6 illustrates and example of messages between the APs and STA for establishing a multi-AP coordination session, according to an embodiment. FIG. 7. illustrates corresponding method steps for establishing a multi-AP coordination session, according to an embodiment. The process is initialized with a request 150 from the STA to its currently associated AP1. AP1 then performs "evaluation" on such a request to determine whether or not to initiate multi-AP coordination. This evaluation performed by AP mainly examines resource allocation parameters and priorities with respect to STA's request. If the decision is "Yes", then AP1 initiates the method illustrated in FIG. 7. Accordingly the AP currently associated with the STA (AP1) performs 710 multicast transmissions 305A, 305B to all APs that are included in its candidate AP list. It is noted that while multicast messages are illustrated, it should be appreciated that a broadcast message or a unicast message to each of AP2 and AP3 could be used. Such a message 305A, B includes information from the STA's request. In some embodiments the multicast message can include the AP1's candidate list (after being updated with information from the STA request message). After the neighboring APs (i.e., AP2 and AP3) receive the multicast message from AP1, the neighboring APs will calculate 720 the Coordination Score with respect to the STA's request based on the information in the multicast message and the AP's own candidate list. The other APs (each of AP2 and AP3) respond 730 with their respective calculated Coordination Score to AP1 via reply messages 315A, 315B. AP1 then collects and compares the Coordination Scores, then notifies the highest score owner to become the leader AP 740. As shown in FIG. 6 AP1 determines the AP3 achieves the highest score (i.e., AP3) as the elected leader AP and sends message 330 to AP3 instructing it to act as the Leader AP. In some embodiments, AP1 can notify other neighboring APs (e.g., AP2) of the election. In some embodiments, AP1 can also send a message to the neighboring APs with information to update their candidate lists, for example the information in Table V. Further, in some embodiments, the APs replies 315A, 315B can include with information to update their candidate lists, for example the information in Table V.

The elected leader AP calculates and determines the most cost-effective coordination scheme, then performs resource scheduling according to STA's request 750. Based on the resource scheduling results, leader AP sends indications to all participating APs to inform their respective "duties" 760. STA's request sets the minimum requirement for multi-AP coordination. In some embodiments, the Leader AP will NOT overly provide resources or services as long as STA's request is satisfied. In other words, leader AP will select the most cost-effective coordination scheme (i.e., in terms of implementation complexity or energy efficiency).

Finally, the multi-AP coordination starts 770. Data packet will be transmitted by using one of the previously discussed multi-AP coordination schemes (i.e., Co-OFDMA, Co-BF, Co-SR, and JTX), as instructed by the leader AP.

In some embodiments, each multi-AP coordination session among APs is used to review and update the Candidate AP list if needed due to any parameter changes observed. In this manner, embodiments provide a history of multi-AP coordination, which provides for an up to date candidate list for each AP. This can be used for subsequent multi-AP coordination.

When handling multiple requesting STAs simultaneously, the proposed scheme is extended in the following way: Firstly, in case of multiple requesting STAs are from same BSS, the associated AP evaluates and processes each STA's request beforehand 210 (e.g., AP may prioritize these requests according to their QoS specification) as shown in Figure-5, then decides whether each STA requires to initiate multi-AP coordination 220. Otherwise STA will go back to standalone transmission mode. After this step, during the AP-to-AP negotiation process, the associated AP will solicit coordination with other neighboring APs by aggregating multiple STAs' requests considered as a whole. Thus, it can guarantee the majority's performance gains and avoid confusion of different configurations/settings for multi-AP coordination.

In case of multiple requesting STAs are from different BSSs, and each independent AP may send out soliciting message for the coordination. The election of leader AP and the resultant resource scheduling follow the majority rule. Specifically, AP informs each other of the requests and calculates respective Coordination Scores, the AP wins the most times of Coordination Score is elected as the leader AP. This aims to guarantee the majority's interests for STAs located in different BSSs.

When handling multiple requesting STAs simultaneously, STAs' requests will be reflected in AP's current workload and therefore affect its Coordination Score calculation. This leads to an ultimate result that the multiple coordinated APs can simultaneously serve a cluster of STAs with non-conflicting demands. In other words, methods of Candidate AP list and Coordination Score together help to resolve and manage multiple requesting STAs efficiently.

In summary, AP-to-AP negotiation aims to enhance mutual understandings of neighboring APs, optimize the load balancing process, and intelligently utilize all available resources.

Some embodiments provide wireless system including a first access point (AP); and a second access point. In such a system, the first access point is configured for: receiving a message relating to multiple AP (multi-AP) coordination from a station (STA); broadcasting information from the message to neighboring APs listed in a table of candidate APs stored in the first AP's memory, the neighboring APs including the second AP; receiving replies from the neighboring APs, the replies including information relating to the STA's message; and sending a control message to the second AP to act as a leader AP for the multi-AP coordination based on the information in the replies. In such a system the second access point is configured for receiving the control message from the first AP; calculating and determining a cost effective coordination scheme to satisfy the control message: performing resource scheduling to support multi-AP coordination for the STA; and messaging participating AP's according to the scheduling for controlling the multi-AP coordination.

Figure 8:
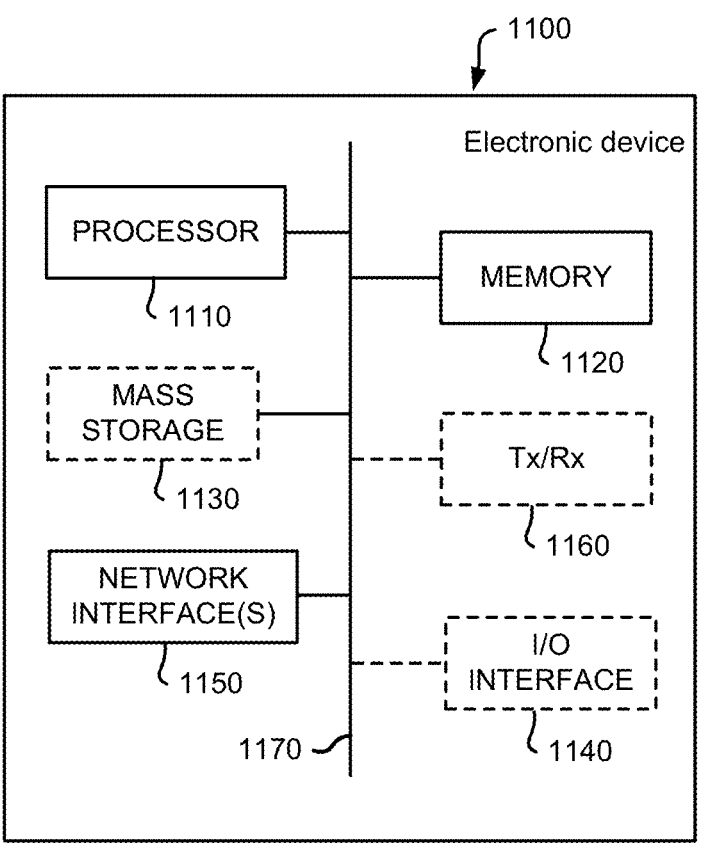
FIG. 8 is a schematic diagram of a device that may perform any or all of operations of the above methods and features explicitly or implicitly described herein, according to different embodiments of the present invention.

FIG. 8 is a schematic diagram of device 1000 that may perform any or all of operations of the above methods and features explicitly or implicitly described herein, according to different embodiments of the present invention. For example, a computer equipped with network function may be configured as device 1000. As may be appreciated by a person skilled in the art, the device 1000 can represent one or more entities described herein, for example, an AP, a STA, or the like.

As shown, the device 1000 may include a processor 1010, such as a Central Processing Unit (CPU) or specialized processors such as a Graphics Processing Unit (GPU) or other such processor unit, memory 1020, non-transitory mass storage 1030, input-output interface 1040, network interface 1050, and a transceiver 1060, all of which are communicatively coupled via bi-directional bus 1070. According to certain embodiments, any or all of the depicted elements may be utilized, or only a subset of the elements. Further, device 1000 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1020 may include any type of non-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for multiple access point (AP) coordination comprising:

detecting, by a station (STA), a triggering event, the STA being served by an associated access point (AP);

analyzing, by the STA, the STA's service needs in response to the triggering event; and sending, by the STA to the associated AP, a message about a change in multi-AP coordination parameters, wherein the message/request is included as part of a physical layer protocol data unit (PPDU).

2. The method of claim 1 wherein the message about a change in multi-AP coordination parameters includes a request for initializing multi-AP coordination.

3. The method of claim 1 wherein the triggering event is triggered by an internal factor related to an application running on the STA.

4. The method of claim 1 wherein the triggering event is triggered by an external factor related to a change in quality of service conditions.

5. The method of claim 1 wherein the request includes a report of analyzed conditions.

6. The method of claim 1 wherein the message/request is included in a designated frame.

7. The method of claim 1, wherein analyzing, by the STA, the STA's service needs in response to the triggering event comprises the STA measuring and analyzing QoS metrics including one or more of:

i) timeliness parameters;

ii) bandwidth parameters; and iii) reliability, stability, and availability parameters.

8. The method of claim 7 wherein sending, by the STA to the associated AP, a message about a change in multi-AP coordination parameters comprises sending one or more of:

i) timeliness parameters: (acknowledgement) ACK delay, jitter;

ii) bandwidth parameters: effective throughput, buffer size; and iii) reliability, stability, and availability parameters: SINR variation, average bit error rate and average frame loss rate.

9. The method of claim 1 further comprising:

the associated AP receiving the message relating to multiple AP (multi-AP) coordination from the STA;

the associated AP broadcasting a message to neighboring APs listed in a table of candidate APs stored in the AP's memory;

the associated AP receiving replies from the neighboring APs, the replies including information relating to the STA's message;

the associated AP selecting an AP to act as a leader AP for the multi-AP coordination based on the information in the replies; and the associated AP participating in the multi-AP coordination according to control messages received from the leader AP.

10. A method of multiple access point (AP) coordination, the method executed by an AP (associated with a station (STA)), the method comprising:

the AP receives a message relating to multiple AP (multi-AP) coordination from the STA;

the AP broadcasts a message to neighboring APs listed in a table of candidate APs stored in the AP's memory;

the AP receives replies from the neighboring APs, the replies including information relating to the STA's message;

the AP selects an AP to act as a leader AP for the multi-AP coordination based on the information in the replies; and the AP participates in the multi-AP coordination according to control messages received from the leader AP.

11. The method of claim 10 wherein the AP selects a neighboring AP as the leader AP.

12. The method of claim 11 wherein the AP updates its table of candidate APs based on the information received in the replies.

13. The method of claim 12 wherein the information received in the replies includes a coordination score, received from each neighboring AP, according to the message relating to multiple AP (multi-AP) coordination from the STA and the method further includes the AP determining a coordination score for itself.

14. The method of claim 13 wherein the AP selects an AP to act as a leader AP for the multi-AP coordination based on the information in the replies includes selecting the AP with the highest coordination score.

15. The method of claim 14 wherein each AP's coordination score is computed based on resource accessibility, resource availability, and resource quality.

16. The method of claim 14 wherein the AP selects itself as the leader AP, and the method further comprises:

the leader AP determines participating APs in the multi-AP coordination; including calculating and determining a cost effective coordination scheme to satisfy the message;

the leader AP performs resource scheduling; and the leader AP messages participating AP's according to the scheduling for controlling the multi-AP coordination.

17. A station (STA) device comprising:

at least one processor:

at least one wireless interface for communicating with at least one access point (AP); and machine readable memory storing machine readable instructions for configuring the STA for:

detecting, by a station (STA), a triggering event, the STA being served by an associated access point (AP);

analyzing, by the STA, the STA's service needs in response to the triggering event; and sending, by the STA to the associated AP, a message about a change in multi-AP coordination parameters, wherein sending, by the STA to the associated AP, a message about a change in multi-AP coordination parameters comprises:

i) sending timeliness parameters: (acknowledgement) ACK delay, jitter;

ii) bandwidth parameters: effective throughput, buffer size; and iii) reliability, stability, and availability parameters: SINR variation, average bit error rate and average frame loss rate.

18. The station as claimed in claim 17 wherein the message about a change in multi-AP coordination parameters includes a request for initializing multi-AP coordination.

*    *    *    *    *